US006586856B2

United States Patent
Oelsch

(10) Patent No.: US 6,586,856 B2
(45) Date of Patent: Jul. 1, 2003

(54) SPINDLE MOTOR WITH SLEEVE FOR HARD DISC DRIVES

(75) Inventor: Jürgen Oelsch, Hohenroth (DE)

(73) Assignee: Precision Motors Deutsche Minebea GmbH, Villingen-Schwenningen (DE)

(*) Notice: Subject to any disclaimer, the term of this patent is extended or adjusted under 35 U.S.C. 154(b) by 0 days.

(21) Appl. No.: 09/939,411

(22) Filed: Aug. 24, 2001

(65) Prior Publication Data

US 2002/0084708 A1 Jul. 4, 2002

(30) Foreign Application Priority Data

Sep. 6, 2000 (DE) .......................... 100 43 808

(51) Int. Cl.[7] .................. H02K 5/16; H02K 5/173; H02K 21/22; G11B 19/20
(52) U.S. Cl. ................ 310/90; 310/67 R; 369/98.07; 369/99.08; 369/99.04
(58) Field of Search ................ 310/67 R, 90, 310/91, 42; 360/99.04, 99.08, 98.07; 384/96, 535, 586, 587

(56) References Cited

U.S. PATENT DOCUMENTS

| 5,463,511 | A |   | 10/1995 | Nakano et al. | ......... 360/99.08 |
| 5,528,092 | A | * | 6/1996 | Ohta | ......... 310/67 R |
| 5,877,918 | A | * | 3/1999 | Katakura et al. | ......... 360/99.08 |
| 5,880,545 | A | * | 3/1999 | Takemura et al. | ......... 310/90 |
| 6,023,113 | A | * | 2/2000 | Otsuka | ......... 310/67 R |
| 6,246,137 | B1 | * | 6/2001 | Obara | ......... 310/90 |

FOREIGN PATENT DOCUMENTS

| EP | 0 613 134 |   | 8/1994 | ......... 310/90 |
| JP | 2002 119012 | * | 4/2002 | ......... 310/67 R |

OTHER PUBLICATIONS

Search Report dated Jun. 29, 2001 for German Application No. 100 43 808.3

* cited by examiner

Primary Examiner—Tran Nguyen
(74) Attorney, Agent, or Firm—Baker & Daniels

(57) ABSTRACT

The invention relates to a spindle motor for solid-plate running gears with a stator, a rotor, the shaft of which is turnably borne with the aid of rolling bearings with respect to the stator, and a shell, in which the shell is constructed as a separate pot-shaped part closed on one side, on the outer circumference of which the stator is held and on the inner circumference of which the outer rings of the rolling bearings are held.

6 Claims, 4 Drawing Sheets

SPINDLE MOTOR WITH SLEEVE FOR HARD DISC DRIVES

BACKGROUND OF THE INVENTION

The invention relates to a spindle motor for hard disc drives, in particular a spindle motor with sleeve according to the generic term of present invention.

In general spindle motors comprise a stator and a rotor turnably borne about a central shaft with respect to this. The bearing occurs by means of rolling bearings, in which the shaft is either joined in fixed position with the stator, or is turnably borne together with the rotor.

In particular, the invention relates to so-called base-plate or basis-plate motors of the last-mentioned type, consisting of rotor, stator and base plate, in which the shaft firmly joined with the rotor is turnably borne with the aid of rolling bearings with respect to the stator fastened indirectly or directly to the base plate. The outer, fixed parts of the roller bearings, therefore the outer rings, are fastened there ordinarily in a shell or sleeve (Milse) open at both ends, which is either an internal component of the base plate or is installed in this as a separate member. The outward-directed opening of the sleeve is covered off and sealed gas-tight.

A disadvantage of the construction described is that for the covering-off of the sleeve opening an additional part is needed, the hermetic sealing-off of which, preferably by means of a liquid sealing agent (bonding agent) is functionally critical, expensive and timeconsuming.

Further disadvantages lie in that motor-relevant parameters are checkable only after the mounting of the rotor in the base plate on the fully assembled motor, so that possible faults cannot be detected until this stage, in which the mounting of the rotor in the base plate is rendered difficult by magnetic forces and moments.

The problem of the invention lies in improving a spindle motor with sleeve for solid-plate running gears, i.e., hard disc drives, in such manner that, on the one hand, the sealing problems addressed above are eliminated and, on the other hand, a more advantageous assembling and testability of the motor are given.

This problem is solved by the features of present invention.

SUMMARY OF THE INVENTION

The invention is distinguished by the separate pot-shaped sleeve closed on one side, on the outer circumference of which the stator is held, and on the inner circumference of which the outer rings of the rolling bearings are held. The sleeve serves, therefore, as assembling aid for the rolling bearings and for the stator.

By reason of the feature that on the outer circumference of the pot-shaped sleeve the stator is held, and on the inner circumference the rolling bearings are held, the motor can already be completed in the base plate and tested before the end of its construction.

There, with the mounting of the thus prefabricated unit into the base plate, no hampering magnetic forces arise.

Further, there is the additional advantage that the member required for the covering-off of the sleeve opening is eliminated, and the sealing-off of the fit between sleeve and base plate can be done very much more simply.

Advantageous further developments and modifications of the invention are yielded from the dependent claims.

It is provided, accordingly, that the sleeve consists of a plastic material. This offers the advantage that a noise damping takes place. Since the sleeve according to the invention surrounds the ball bearings radially externally, the noises that proceed from the bearings are damped.

It is just as possible, of course, to make the sleeve of metal or of a metal alloy.

As an assembling aid for the stator, the sleeve can have a step or a collar on its upper open end, on which the stator bears.

For the reception of the motor, on the base plate there is provided a corresponding interruption into which the sleeve is installed true to measure, and fastened by a preferably sealing cementing. After installation of the motor into the base plate, the interruption is closed from the bottom of the sleeve. A sealing of the fitting joint between sleeve and base plate prevents the penetration of contaminated air from the environment into the interior of the hard disc drives. Simultaneously the bearing system is bounded by the base integrated into the sleeve, so that no dirt particles can force their way from the outside into the bearing system.

The inventive object of the present invention is yielded not only from the object of the individual patent claims, but also from the combination of the individual patent claims among one another. All of the data and features disclosed in the documents, inclusive of the abstract, especially the spatial construction shown in the drawing, are claimed as essential to the invention insofar as, individually or in combination, they are novel with respect to the state of the art.

BRIEF DESCRIPTION OF THE DRAWINGS

In the following, the invention is explained in detail with the aid of a drawing showing several forms of execution. Here from the drawing and its description, there proceed further features and advantages of the invention.

In the drawing.

In all the figures described in the following the like members are provided with the same reference number, so that a separate description of its own for each figure can be dispensed with.

DETAILED DESCRIPTION OF THE INVENTION

Figure 4:
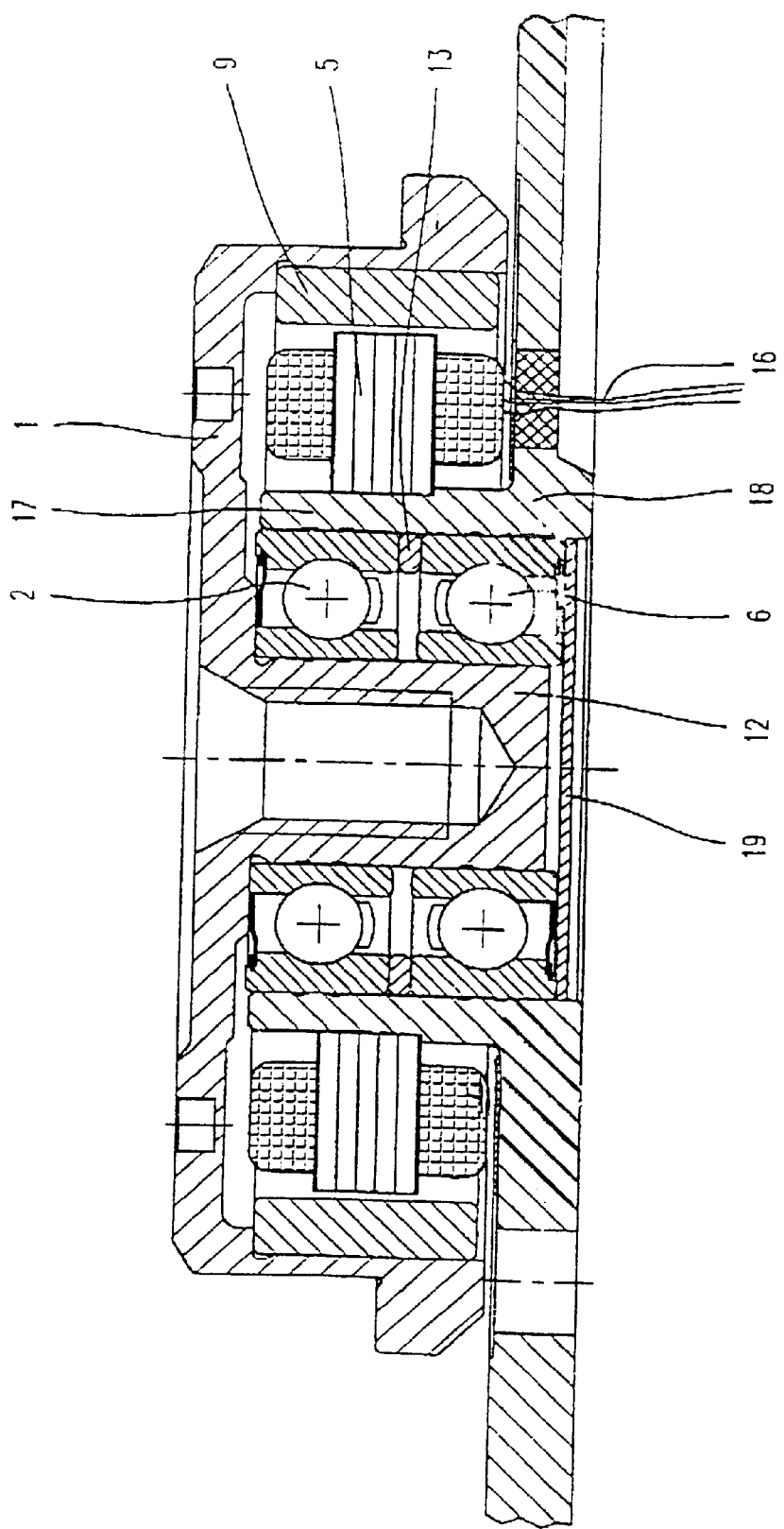
FIG. 4 a section through a spindle motor with sleeve according to the state of the art.

FIG. 4 shows a spindle motor for hard disc drives according to the state of the art. The spindle motor comprises an about bell-shaped rotor 1, which is untwistably joined with a shaft 12. The shaft 12 is borne by means of rolling bearings 2 and 6 in a sleeve-form projection 17 of the base plate 18. To the outsideof the sleeve-form projection 17 a stator 5 is fastened. The outward-directed opening of the base plate 18 or of the sleeve-form projection 17 is covered by means of a covering 19 and sealed gastight.

Figure 1:
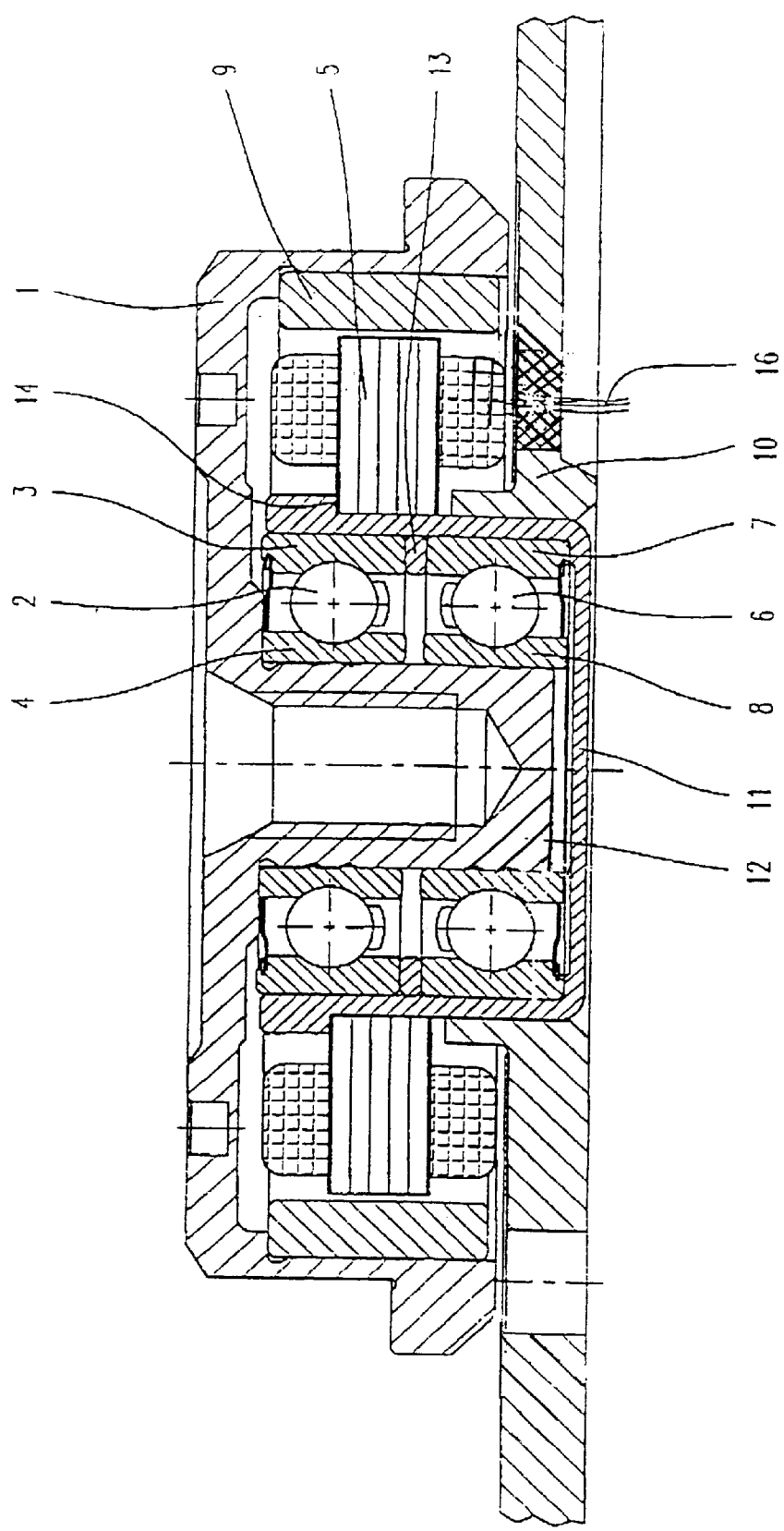
FIG. 1 shows a section through a first form of execution of the spindle motor with sleeve.
Figure 2:
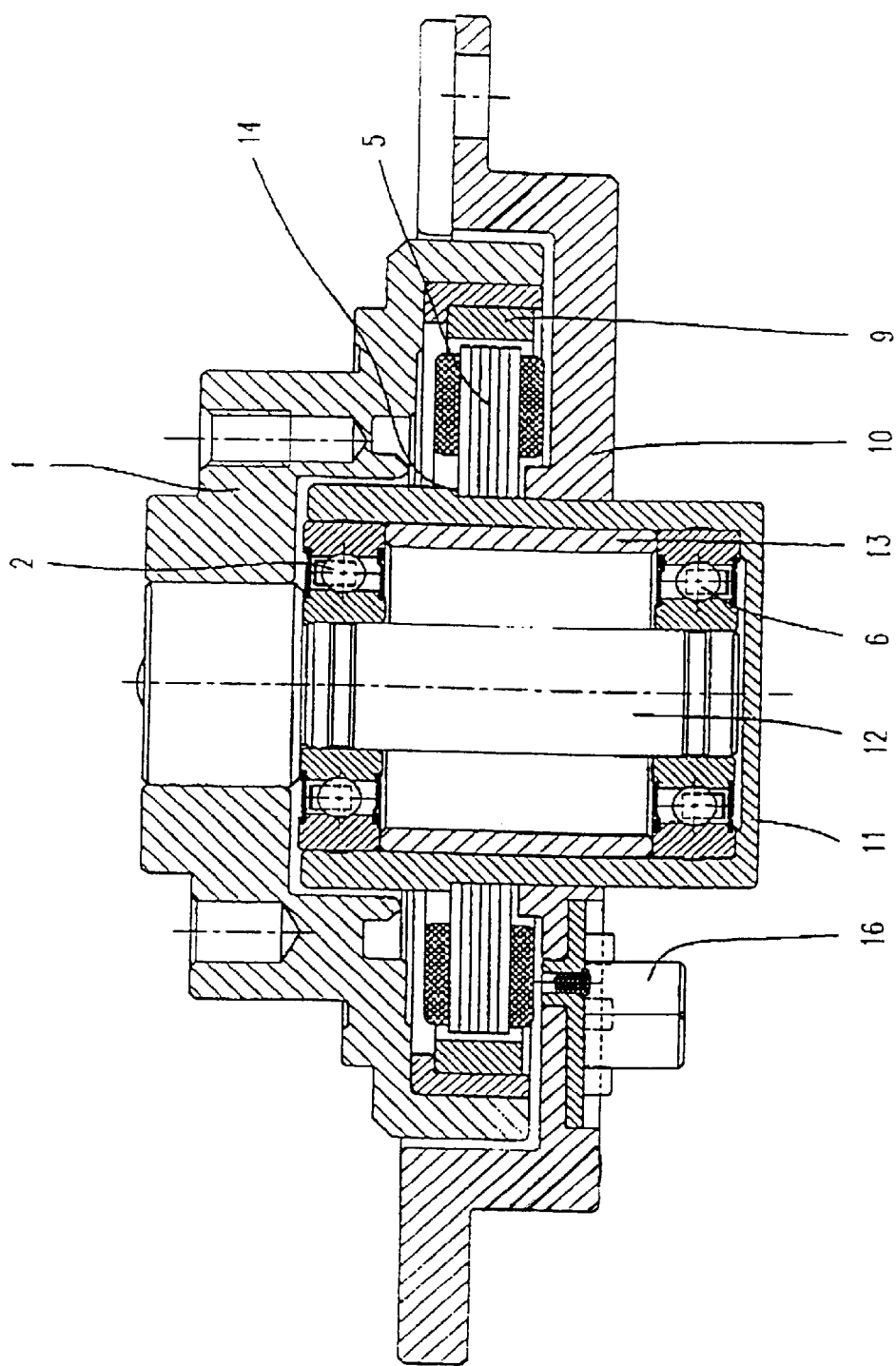
FIG. 2 a section through a second form of execution of the spindle motor with sleeve.
Figure 3:
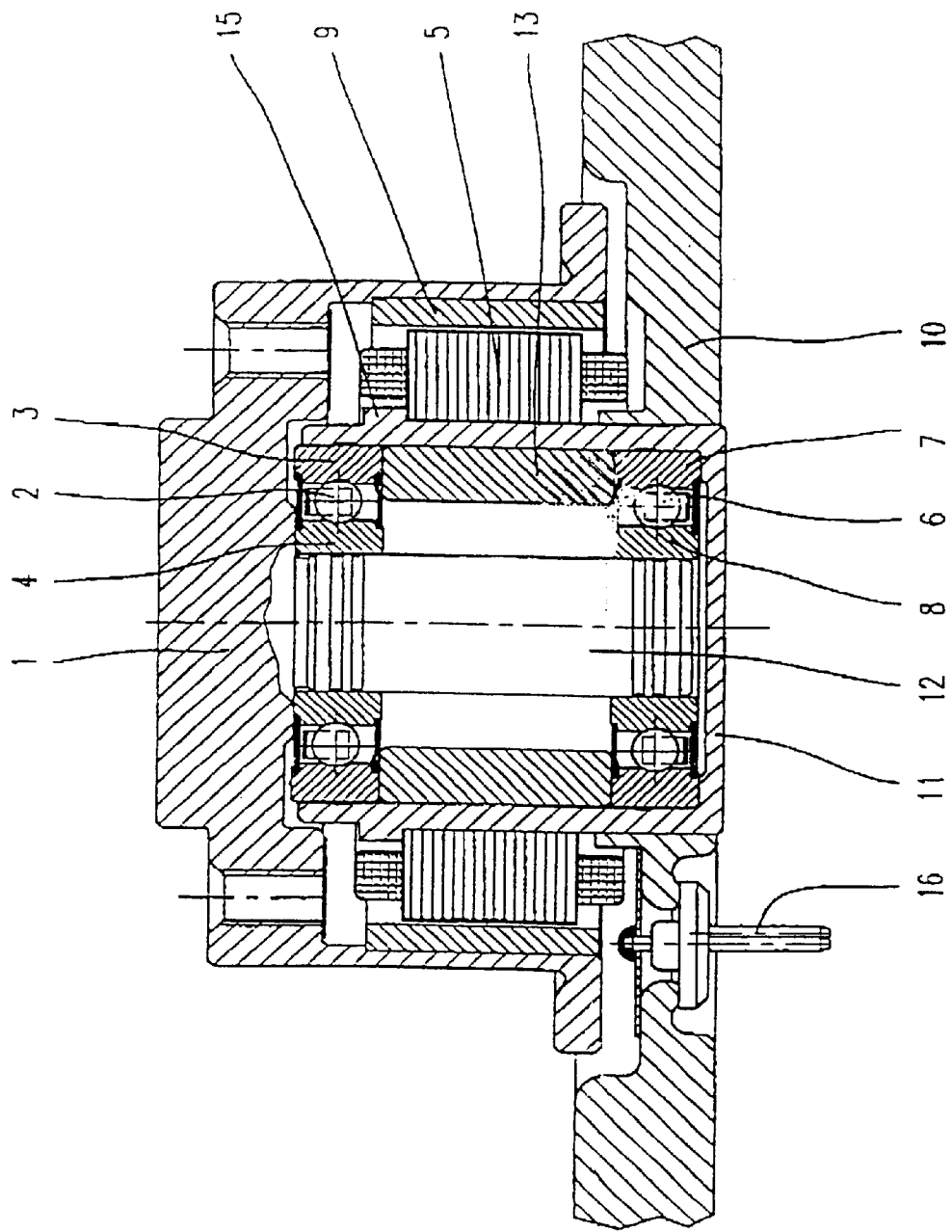
FIG. 3 a section through a third form of execution of the spindle motor with sleeve.

As is yielded from FIGS. 1 to 3, the spindle motor of the invention likewise comprises an about bell-shaped rotor 1, which is joined untwistably with a shaft 12.

This is an about pot-shaped sleeve 11, closed on one side, and opened upward, to the inside of which there are fastened the outer rings 3 and 7, respectively, of the rolling bearings 2 and 6. The corresponding inner rings 4 and 8 of the rolling bearings 2 and 6, respectively, are fastened to the shaft 12. Between the corresponding outer and inner rings 3, 4 and 7, 8, respectively, rolling bodies are arranged, so that the unit of rotor 1 and shaft 12 is turnably borne with respect to the stationary sleeve 11.

The stator 5 consisting of metal stack provided with coils is arranged on the outer circumference of the sleeve 11 and firmly joined with this. The stator 5 stands in functional connection with a permanent magnet 9 fastened in the rotor 1 and spaced with respect to the stator 5 in such manner that by corresponding current supplying of the coils an electromagnetic field is generated, the torque of which sets into rotation the unit consisting of rotor 1, shaft 12 and permanent magnet 9.

The sleeve 11 itself is received firmly in a central interruption of the base plate 10. The base plate 10 comprises the further electrical connection arrangements 16, over which the windings of the winding back are supplied with current.

The sleeve 11 consists preferably of a plastic material, but it can just as well consist of a metal material.

As one perceives in FIGS. 1 and 2, the sleeve 11 can have a step 14 on the upper open zone, which serves as stop and assembling aid for the stator 5. In FIG. 3 there is formed, instead of the step, a collar 16 which fulfills the same function.

All the forms of execution have in common the feature that the sleeve serves as an assembling aid in the composition of the spindle motor and makes possible a function test of the spindle motor before the final assembly.

In the assembling of the motor, first the lower bearing 6 is installed in the sleeve 11. Then the spacer 13 is mounted and subsequently the upper bearing 2. Thereupon the unit consisting of shaft 12 and rotor 1 is installed and centered in correct position to the sleeve 11. Finally the stator 5 is mounted on the outer circumference of the sleeve 11.

Already in the assembling stage the motor is capable of running and can be tested in respect to the motor-specific parameters.

It is only after the testing cycle that the motor is installed in the base plate 10, as the sleeve 11 is installed beside the stator 5 with its attachment parts in the interruption of the base plate 10, that is provided, there fixed in proper position and cemented.

REFERENCE NUMBERS OF THE DRAWINGS

1 Rotor
2 Rolling bearing (above)
3 Outer ring
4 Inner ring
5 Stator (winding pack)
6 Rolling bearing (below)
7 Outer ring
8 Inner ring
9 Magnet
10 Base plate
11 Sleeve
12 Shaft
13 Spacer
14 Step
15 Collar
16 Connection arrangements
17 Sleeve-form projection
18 Base plate
19 Covering

What is claimed is:

1. Spindle motor for solid-plate running gears with a stator (5) stationary with respect to a base plate (10), a rotor (1), a rotary shaft (12) with support of rolling bearings (2, 6) is rotatably borne with respect to the stator (5), and a sleeve (11), characterized in that the sleeve (11) is constructed as a separate pot-shaped part having two axial ends, wherein one of said axial ends being closed and the other axial end being opened, said sleeve having respective inner and outer circumferential walls, wherein the stator (5) is held on the outer circumferential wall, and outer rings (3, 7) of the rolling bearings are held on said inner circumferential wall.

2. Spindle motor according to claim 1, characterized in that the sleeve (11) consists of plastic material.

3. Spindle motor according to claim 1, characterized in that the sleeve (11) consists of metal or of a metal alloy.

4. Spindle motor according to claim 1, characterized in that the axial opened end of the sleeve is an upper axial opened end having a step (14) or a collar (15) thereon as assembling aid for the stator (5).

5. Spindle motor according to claim 1, characterized in that the sleeve (11) is firmly joined with the base plate (10).

6. Spindle motor according to claim 5, characterized in that a connection between sleeve (11) and base plate(10) is a bonding connection.

* * * * *